United States Patent
Lee

(10) Patent No.: US 12,522,280 B2
(45) Date of Patent: Jan. 13, 2026

(54) STEERING CONTROL DEVICE AND METHOD

(71) Applicant: HL MANDO CORPORATION, Gyeonggi-do (KR)

(72) Inventor: Jaewoo Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 680 days.

(21) Appl. No.: 17/975,579

(22) Filed: Oct. 27, 2022

(65) Prior Publication Data

US 2023/0137367 A1 May 4, 2023

(30) Foreign Application Priority Data

Oct. 29, 2021 (KR) .................. 10-2021-0146658

(51) Int. Cl.
*B62D 5/04* (2006.01)
*B62D 15/02* (2006.01)

(52) U.S. Cl.
CPC ....... *B62D 5/0481* (2013.01); *B62D 15/0225* (2013.01)

(58) Field of Classification Search
CPC .......................... B62D 5/0481; B62D 15/0225
USPC ........................................................ 180/402
See application file for complete search history.

(56) References Cited

U.S. PATENT DOCUMENTS

2022/0297746 A1* 9/2022 Washnock ........... B62D 5/0427

FOREIGN PATENT DOCUMENTS

| DE | 102 44 070 | 3/2004 | |
|---|---|---|---|
| DE | 10244070 A1 * | 3/2004 | ......... B62D 15/0245 |
| DE | 10 2006 015 636 | 10/2007 | |
| DE | 10 2006 022 663 | 11/2007 | |
| DE | 10 2007 001 965 | 7/2008 | |
| DE | 10 2010 048 261 | 4/2012 | |
| DE | 10 2014 204 461 | 11/2014 | |
| DE | 102014204461 A1 * | 11/2014 | ............... B62D 6/04 |

(Continued)

OTHER PUBLICATIONS

Office Action dated Oct. 2, 2024 for German Patent Application No. 10 2022 211 396.9 and its English translation provided by Applicant's foreign counsel.

(Continued)

*Primary Examiner* — Jacob D Knutson
(74) *Attorney, Agent, or Firm* — WOMBLE BOND DICKINSON (US) LLP

(57) ABSTRACT

The embodiments relate to a steering control device and method. Specifically, a steering control device according to an embodiment may include a receiver configured to receive vehicle driving information of a host vehicle from a plurality of sensors, a straight-driving determiner configured to determine whether the host vehicle travels in a straight line based on the vehicle driving information, and determine a straight travel time, a short-term storage configured to store a first summation value obtained by summing rack positions received every predetermined period, a long-term storage configured to store a first average value of the first summation values stored in the short-team storage, and a determiner configured to determine a standard error of a rack position based on the first average value, and determine a rack position offset of the host vehicle if the standard error is less than a reference value.

16 Claims, 7 Drawing Sheets

(56) References Cited

FOREIGN PATENT DOCUMENTS

| | | |
|---|---|---|
| JP | 6-127281 | 5/1994 |
| JP | 2001-178206 | 7/2001 |
| KR | 10-2013-0066116 | 6/2013 |
| KR | 10-2017-0065795 | 6/2017 |
| KR | 10-2019-0044402 | 4/2019 |

OTHER PUBLICATIONS

Notice of Allowance dated Dec. 13, 2024 for Korean Patent Application No. 10-2021-0146658 and its English translation provided by Applicant's foreign counsel.

* cited by examiner

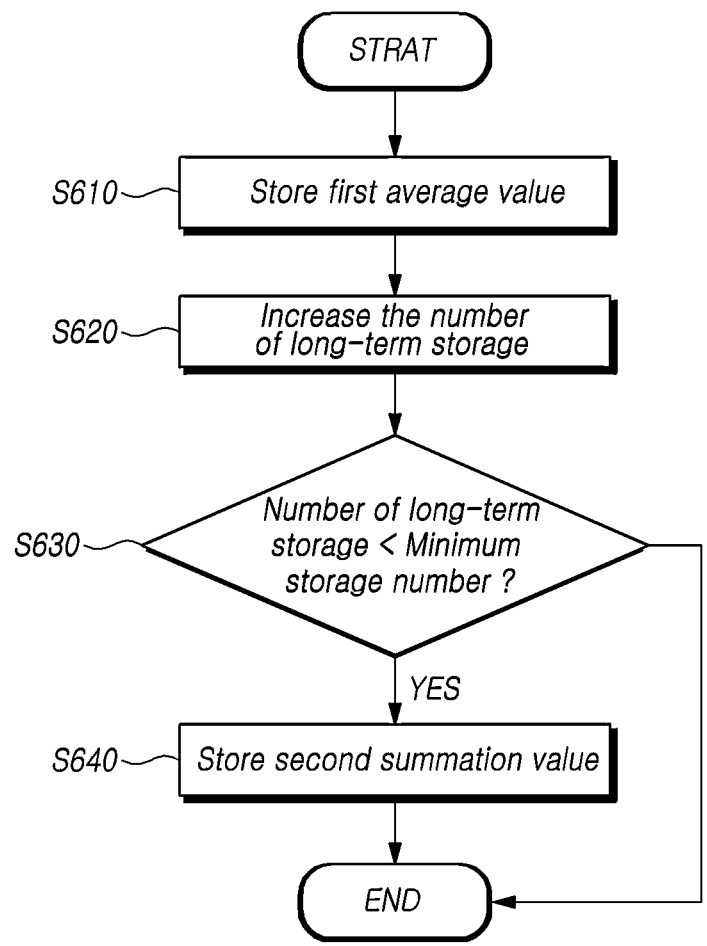

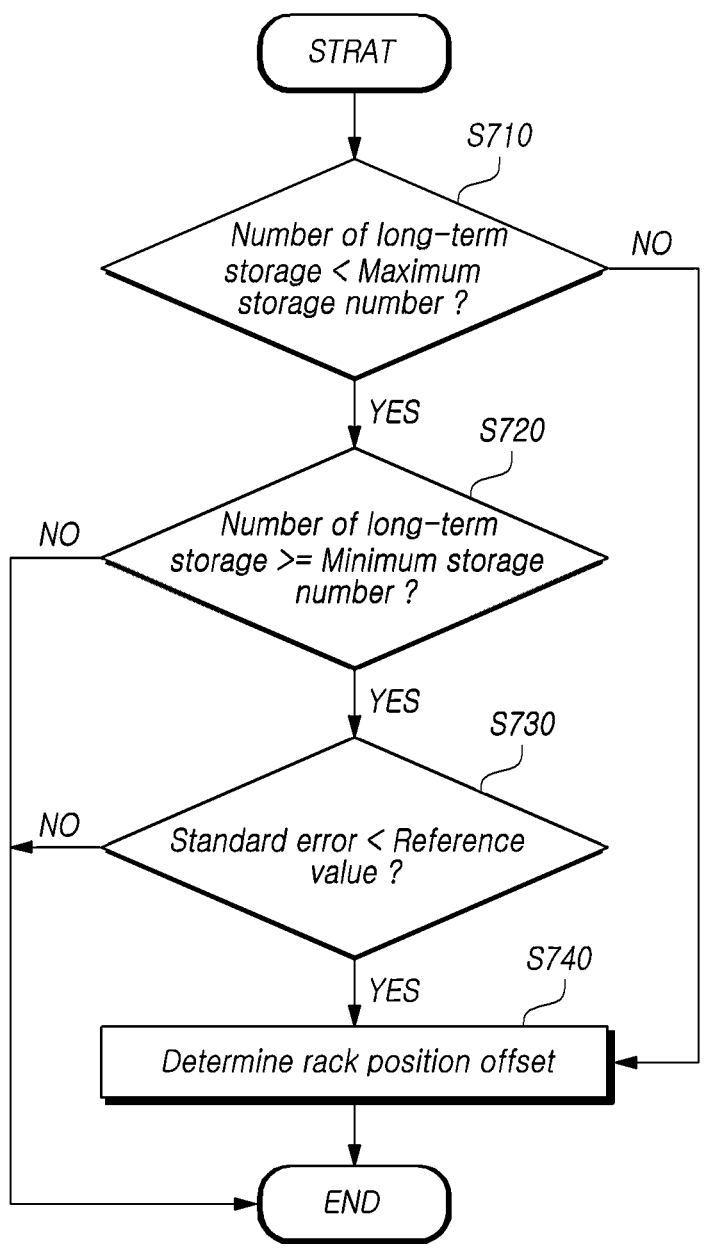

STEERING CONTROL DEVICE AND METHOD

CROSS REFERENCE TO RELATED APPLICATION

This application claims priority from Korean Patent Application No. 10-2021-0146658, filed on Oct. 29, 2021, which is hereby incorporated by reference for all purposes as if fully set forth herein.

TECHNICAL FIELD

Embodiments of the present disclosure relate to a steering control device and method.

In general, a power assistance steering device is used in a vehicle as a means for reducing the steering force of a steering wheel to ensure the stability of the steering state. As such a power assistance steering device, a hydraulic power steering system (HPS) using hydraulic pressure has been widely used in the past. Recently, unlike the conventional method using hydraulic pressure, an electric power steering (EPS) system, which uses the rotational force of a motor to facilitate the driver's steering force and is environmentally friendly, is commonly used in vehicles.

Meanwhile, in order to reduce the weight of the vehicle, there is developed a steer-by-wire (SBW) system in which a steering shaft (or column) including a steering wheel and a reaction force motor is electronically connected with an actuator including a wheel and a rack bar to transfer the driver's steering force.

Since this steering system controls the steering of a host vehicle by adding or replacing the driver's steering force, if the rack position is set incorrectly, the driver's steering feeling may deteriorate or a steering pull phenomenon may occur. Accordingly, there is a need for a method for determining and compensating for a rack position offset value of a vehicle in real time.

SUMMARY

In this background, embodiments of the present disclosure provide a steering control device and method for determining the standard error of the rack position to determine the rack position offset In an aspect of the present disclosure, there is provided a steering control device including a receiver configured to receive vehicle driving information of a host vehicle from a plurality of sensors, a straight-driving determiner configured to determine whether the host vehicle travels in a straight line based on the vehicle driving information, and determine a straight travel time when determined that the host vehicle travels in the straight line, a short-term storage configured to store a first summation value obtained by summing rack positions received every predetermined period, a long-term storage configured to store a first average value of the first summation values stored in the short-term storage, and a determiner configured to determine a standard error of a rack position based on the first average value, and determine a rack position offset of the host vehicle if the standard error is less than a reference value.

In another aspect of the present disclosure, there is provided a steering control method including receiving vehicle driving information of a host vehicle from a plurality of sensors, determining whether the host vehicle travels in a straight line based on the vehicle driving information, and determining a straight travel time when determined that the host vehicle travels in the straight line, storing a first summation value obtained by summing rack positions received every predetermined period, storing a first average value of the first summation values stored, and determining a standard error of a rack position based on the first average value and determining a rack position offset of the host vehicle if the standard error is less than a reference value.

According to embodiments of the steering control device and method according to the present disclosure, it is possible to determine and compensate a more accurate offset value by acquiring the average of two times by dividing the storage period into short-term and long-term.

In addition, since a standard deviation is calculated instead of the simple mean and the standard error is calculated based on this, it is possible to conservatively deal with erroneously calculated or biased data.

BRIEF DESCRIPTION OF THE DRAWINGS

FIG. 6 is a diagram for describing step S340 in more detail according to an embodiment.

FIG. 7 is a diagram for describing in detail step S350 according to an embodiment.

DETAILED DESCRIPTION

Figure 1:
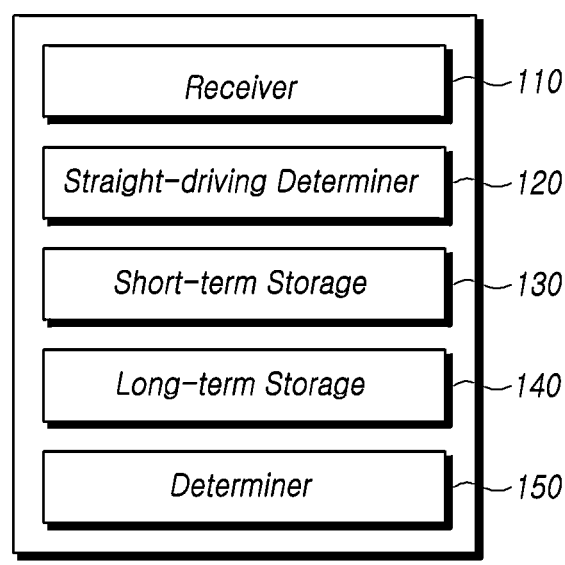
FIG. 1 is a block diagram illustrating a steering control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a steering control device 10 according to an embodiment of the present disclosure with reference to the accompanying drawings.

FIG. 1 is a block diagram illustrating a steering control device 10 according to an embodiment of the present disclosure.

Referring to FIG. 1, a steering control device 10 according to an embodiment of the present disclosure may include a receiver 110, a straight-driving determiner 120, a short-term storage 130, a long-term storage 140 and a determiner 150.

The steering control device 10 according to an embodiment of the present disclosure may be an advance driver assistance system (ADAS) which is mounted on a host vehicle and provides information to assist the driving of the host vehicle or provides assistance to the driver in controlling the host vehicle.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

Here, the host vehicle may refer to a vehicle capable of moving on the ground without using a railroad or a built-in line by mounting a prime mover and rolling wheels with the power. The host vehicle may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle or an autonomous vehicle that automatically travels without driver intervention.

The receiver 110 may receive vehicle driving information from a plurality of sensors. Here, the vehicle driving information may refer to sensing information to be referred to in order to determine whether the host vehicle is traveling in a straight line in a straight-driving determiner, which will be described later.

Examples of vehicle driving information may include rack position information, vehicle speed information, yaw rate information, steering angle information, motor position information, and motor torque information.

Accordingly, a rack position sensor, a vehicle speed sensor, a yaw rate sensor, a steering angle sensor, a motor position sensor (MPS), and a motor torque sensor may be respectively mounted on the host vehicle. In addition, in one embodiment, the steering control device may be included in a steering control system 1.

Hereinafter, it will be described an embodiment of the steering control system 1 capable of performing the function of the steering control device 10 and performing the function of controlling the steering of the host vehicle.

Figure 2:
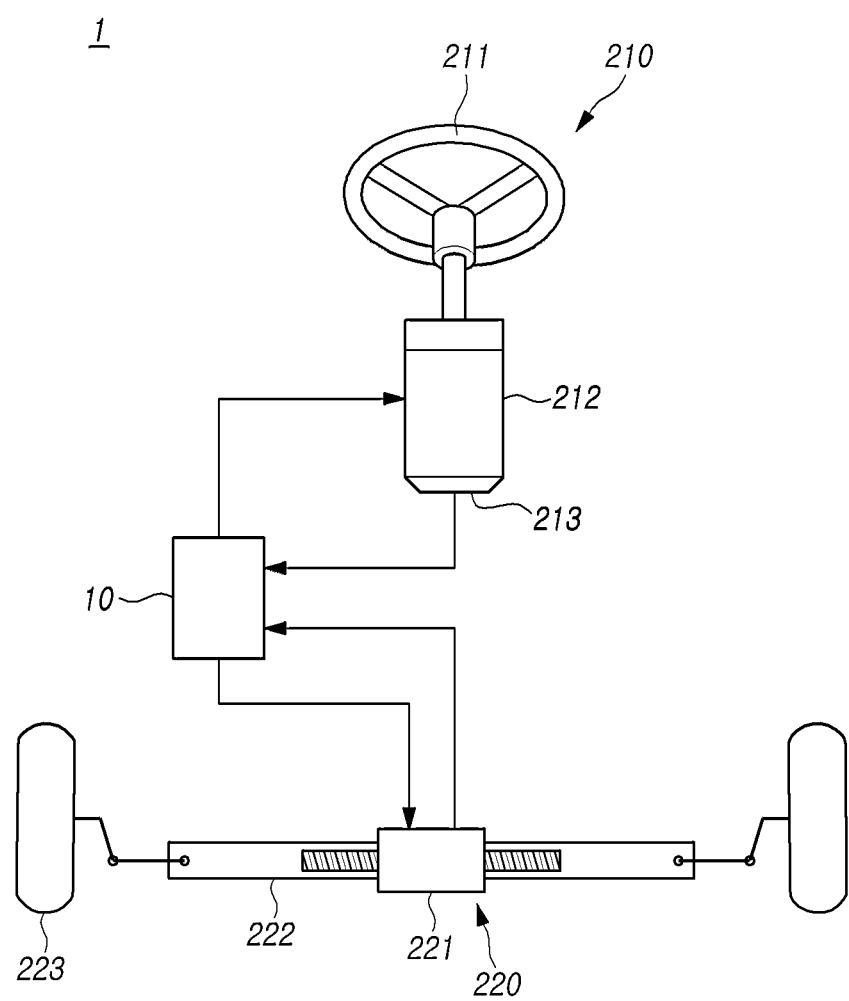
FIG. 2 is a diagram schematically illustrating a steering control system according to an embodiment.

FIG. 2 is a diagram schematically illustrating a steering control system 1 according to an embodiment.

Referring to FIG. 2, the steering control system 1 according to an embodiment may refer to a system which controls the steering of the host vehicle on which the steering control system 1 is mounted according to a rotation angle of a steering wheel operated by a driver.

This steering control system 1 may be, according to a driving method to provide steering assistance power, a hydraulic power steering (HPS) system for providing steering assistance by turning a pump to generate hydraulic pressure, or an electronic power steering (EPS) system for providing steering assistance by driving a motor.

Meanwhile, the steering control system 1 may be, depending on whether a steering input actuator 210 and a steering output actuator 220 are coupled by a mechanical connection member (or linkage), a mechanical steering control system in which a force (torque) generated by the driver rotating the steering wheel 211 is transmitted to the steering motor 221 through a mechanical power transmission device (e.g., a linkage, etc.) and the vehicle wheel 223 is steered by driving the steering motor 221, or a steer-by-wire (SbW) system which transmits and receives electrical signals through wires and cables instead of mechanical power transmission devices. Hereinafter, the steering control system 1 will be described based on the SbW system, but is not limited thereto.

The steering control system 1 according to the present disclosure shown in FIG. 2 may include a steering input actuator 210, a steering control device 10, a steering output actuator 220, and the like. As described above, in the case that the steering control system 1 is an SbW system, the steering input actuator 210 and the steering output actuator 220 may be mechanically separated.

The steering input actuator 210 may refer to a device to which steering information intended by a driver is input. As described above, the steering input actuator 210 may include a steering wheel 211, a steering shaft 212, and a reaction force motor 213. In addition, although not shown, a steering angle sensor for detecting a rotation angle of the steering wheel 211 may be further included.

The reaction force motor 213 may receive a control signal (or referred to as a command current) from the steering control device 10 to apply a reaction force to the steering wheel 211. Specifically, the reaction force motor 213 may receive a command current from the steering control device 10 and may be driven at a rotation speed indicated by the command current to generate a reaction force torque, and transmit the reaction force torque to the steering wheel through a steering gear.

The steering control device 10 may receive steering information from the steering input actuator 210 to calculate a control value, and output an electrical signal indicating the control value to the steering output actuator 220. Here, the steering information may mean information including at least one of a steering angle and a torque by the driver.

The steering control device 10 may receive the power information actually output from the steering output actuator 220 as feedback to calculate a control value, and output an electrical signal indicating the control value to the steering input actuator 210 so as to provide a steering feeling to the driver.

The steering output actuator 220 may refer to a device for driving the host vehicle to steer. The steering output actuator 220 may include a steering motor 221, a rack 222, a wheel 223, a vehicle speed sensor, a rack position sensor, a yaw-rate sensor, and the like.

The steering input actuator 210 and the steering output actuator 220 may further include a motor torque sensor capable of detecting the motor torque of the reaction force motor 213 and the steering motor 221 and a motor position sensor capable of detecting a motor position.

The steering motor 221 may move the rack 222 in the axial direction. Specifically, the steering motor 221 may receive a command current from the steering control device 10 to be driven, and may cause the rack 222 to linearly move in the axial direction.

The rack 222 may perform a linear motion by being driven by the steering motor 221, and the wheel 223 may be steered left or right through the linear motion of the rack 222.

Although not shown, the steering control system 1 may further include a clutch capable of separating or coupling the steering input actuator 210 and the steering output actuator 220. Here, the clutch may be operated under the control of the steering control device 10.

In the case that the steering control system 1 is an SbW system and the host vehicle drives in the autonomous driving mode, the steering control system 1 according to the present disclosure may control only the steering output actuator 220 to perform steering control of the host vehicle, or may control both the steering input actuator 210 and the steering output actuator 220 to perform steering control of the host vehicle.

As described above, the receiver 110 may receive vehicle driving information including respective sensing information from a plurality of sensors included in the steering control system 1.

In an embodiment, the receiver 110 may further receive image information from an image sensor such as a radar, a camera sensor, and a lidar sensor, and navigation information using GPS.

Referring to FIG. 1 again, the straight-driving determiner 120 may determine whether the host vehicle travels in a straight line based on the vehicle driving information, and when it is determined that the host vehicle travels in a straight line, a straight travel time may be determined.

The straight-driving determiner 120 may determine whether the host vehicle is driving in the straight line by using steering angle information, yaw rate information, rack position information, motor position information, and the like. For example, if the steering angle, yaw rate, rack position, and the like do not change from neutral, the straight-driving determiner 120 may determine that the host vehicle travels in a straight line.

The straight-driving determiner 120 may determine the straight travel time of the host vehicle through navigation information and vehicle speed information. For example, the straight-driving determiner 120 may determine that the route to be driven by the host vehicle is a straight-line route by using the navigation information, and determine the straight travel time by determining the time to reach the last section of the straight-line route by using the vehicle speed sensor.

The short-term storage 130 may store a first summation value obtained by summing the rack positions received every predetermined period. Accordingly, the first summation value may be continuously increased by summing the rack position values received every predetermined period.

Specifically, the short-term storage 130 may store the first summation value if it is determined that the host vehicle is traveling in a straight line and the straight travel time is greater than a storage reference time. That is, the short-term storage 130 may store a first rack position offset data by storing the rack position in a state in which the host vehicle travels in a straight line. In addition, as described above, the steering control device 10 according to the present disclosure may store the summation value of the rack position values, rather than storing the respective rack position values, thereby efficiently utilizing the storage space.

Here, the storage reference time may mean a time to secure as a period for receiving a rack position. Accordingly, the storage reference time may be set including the aforementioned predetermined period in order to secure the minimum reception time.

The short-term storage 130 may determine the validity of the first summation value stored in the previous period when it is determined that the host vehicle has finished the straight-line travel. If the first summation values stored in the previous period are valid, there may be determined a first average value which is an average of the first summation values stored in the previous period. If the first summation value is stored, the short-term storage 130 may increase the number of short-term storage, and the first average value may be determined by dividing the first summation with the number of short-term storage. The number of short-term storage described above may be changed according to a setting.

In addition, the short-term storage 130 may determine the rack position offset which changes in the short-term through the calculated first average value. For example, if there is no time margin for calculating a second average value since the host vehicle travels on a road with frequent changes in road gradient, the offset value may be calculated and applied by using the first average value to respond to such a change.

As described above, according to the present disclosure, an offset value corresponding to a short-term change may be calculated as a first average value and applied immediately so as to prevent a deterioration of the driver's manipulation feeling.

The long-term storage 140 may store a first average value of the first summation values stored in the short-term storage 130.

Specifically, the long-term storage 140 may store the first average value if it is determined that the host vehicle has completed the straight-line travel. If the first average value is stored, the long-term storage 140 may add or increase the number of long-term storage. In addition, if the number of long-term storage is less than or equal to the minimum storage of storage, the second summation value may be stored by summing the first average value. The second summation value may be calculated by adding the first average value to the previous second summation value whenever the number of long-term storage is increased. That is, the second summation value may increase with time, similar to the above-described first summation value. The number of long-term storage described above may be changed according to a setting.

The determiner 150 may determine a standard error of the rack position based on the stored first average value, and if the standard error is less than a reference value, may determine the rack position offset of the host vehicle.

The determiner 150 may determine the rack position offset if the number of long-term storage is greater than or equal to a maximum storage number. Here, the determiner 150 may calculate a second average value by dividing the second summation value by the number of long-term storage, and determine the calculated second average value as the rack position offset.

In addition, since the standard error may be a standard deviation of the sample mean, the standard error of the rack position may be the standard deviation of the first average value corresponding to the sample mean. Accordingly, the determiner 150 may determine the standard error of the rack position by using the first average value stored in the long-term storage 140. In the method of calculating the standard deviation, the standard deviation may be calculated by calculating the average of the squares of the deviations of the first average value, or the standard deviation may be determined as a difference between the mean of the squares of the first average value and the square of the mean of the first average value. In the present disclosure, in order to increase memory utilization efficiency, there may apply the method of calculating the standard deviation by the difference between the mean of the squares and the square of the mean.

As described above, since the steering control device 10 according to the present disclosure divides the storage period into short-term and long-term to obtain an average of two times, it is possible to determine a more accurate offset value to compensate therefor.

In addition, the steering control device 10 according to the present disclosure may determine the rack position offset if the standard error is less than the reference value, so that the correct rack position offset value may be obtained except for the case where the rack position value is greatly changed in a specific situation.

The steering control device 10 may be implemented as an electronic control unit (ECU), a microcomputer, or the like.

In an embodiment, a computer system (not shown) such as the steering control device 10 may be implemented as an electronic control unit (ECU). The electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the steering control device 10 according to the present embodiment and the receiver 110, the straight-driving determiner 120, the short-term storage 130, the long-team storage 140 and the determiner 150 included therein may be implemented as a control device of a steering system of a vehicle or as a module of an ECU.

The control device or ECU of such a steering system may include a processor, a storage device such as a memory, and a computer program capable of performing a specific function. In addition, the above-described receiver 110, the straight-driving determiner 120, the short-term storage 130, the long-term storage 140 and the determiner 150 may be implemented as software modules capable of performing respective corresponding functions.

That is, the receiver 110, the straight-driving determiner 120, the short-term storage 130, the long-term storage 140 and the determiner 150 according to the present embodiment may be implemented as respective software modules and stored in a memory, and each software module may be executed at a specific time point in an arithmetic processing unit such as an ECU included in the steering system.

Hereinafter, it will be described a steering control method using the steering control device 10 capable of performing all of the above-described present disclosure.

Figure 3:
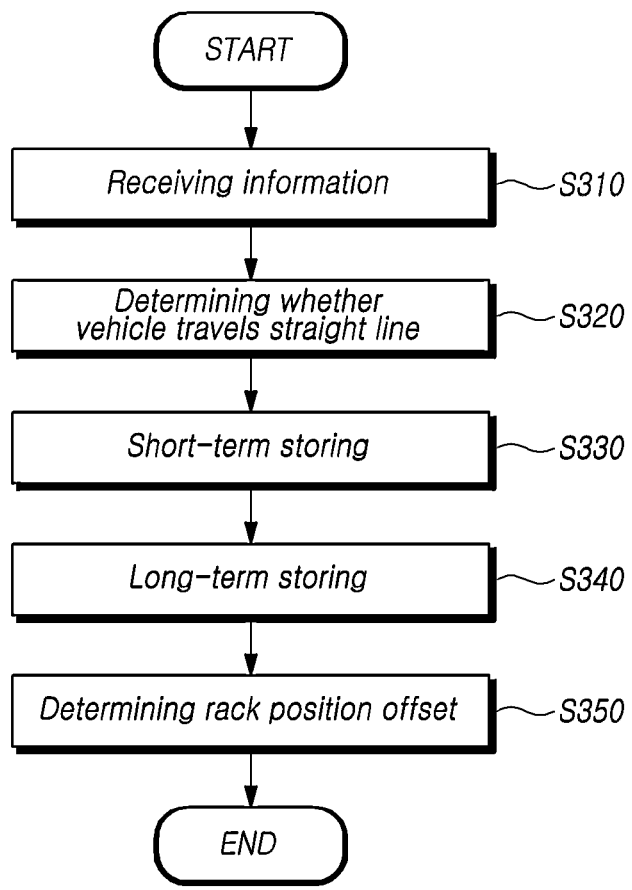
FIG. 3 is a flowchart illustrating a steering control method according to an embodiment of the present disclosure.

FIG. 3 is a flowchart illustrating a steering control method according to an embodiment of the present disclosure.

Referring to FIG. 3, in the steering control method according to the present disclosure may include the information receiving step S310 of receiving vehicle driving information of the host vehicle from a plurality of sensors, the straight-driving determining step S320 of determining whether the host vehicle travels in a straight line based on the vehicle driving information, and if it is determined that the host vehicle travels in a straight line, calculating a straight travel time, a short-term storage step S330 of storing the first summation of the rack positions received every predetermined period, a long-term storage step S340 of storing the first average value of the stored first summation values, and the determining step S350 of determining the standard error of the rack position based on the stored first average value and determining the rack position offset of the host vehicle if the standard error is less than the reference value.

Figure 4:
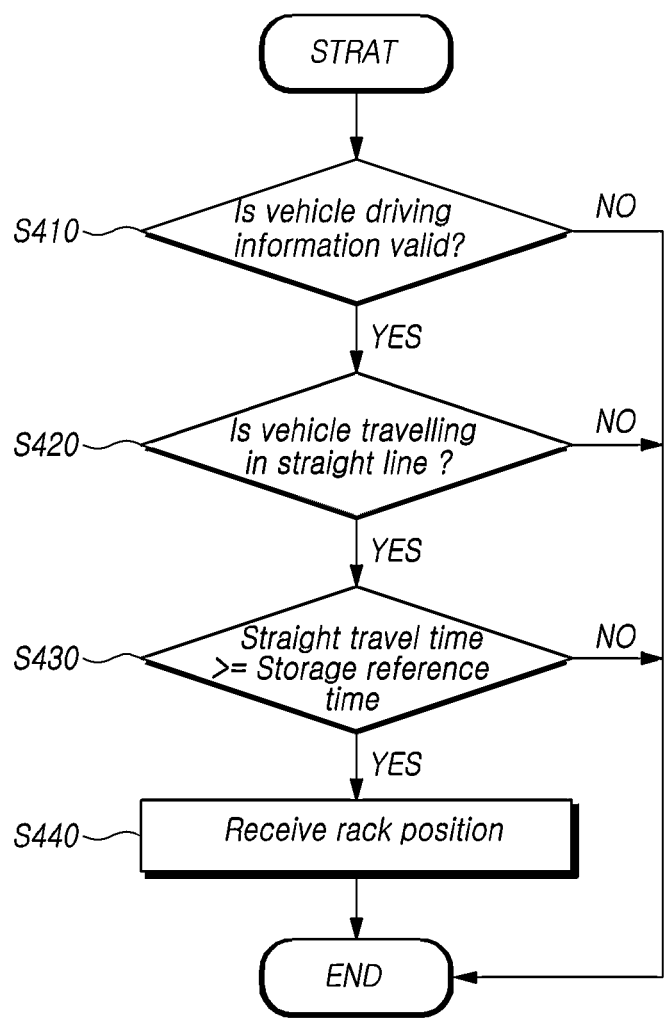
FIG. 4 is a flowchart for describing step S320 in more detail according to an embodiment.

FIG. 4 is a flowchart for describing step S320 in more detail according to an embodiment.

Referring to FIG. 4, the steering control device 10 may determine whether the received vehicle driving information is valid (S410). Specifically, the steering control device 10 may determine whether the sensing information received from the plurality of sensors is a result of performing respective functions without malfunction.

If it is determined that the vehicle driving information is not valid (No in S410), the steering control device 10 may terminate the straight-driving determination. Then, by reviewing the validity of each sensor, it is possible to generate an alarm for notifying the sensor with a failure to the driver.

If it is determined that the vehicle driving information is valid (Yes in S410), the steering control device 10 may determine whether the host vehicle travels in a straight line (S420). For example, the steering control device 10 may determine whether the host vehicle is driving in a straight line by using yaw rate information, rack position information, steering angle information, motor position information, etc. included in the vehicle driving information.

If it is determined that the host vehicle does not travel in a straight line (No in S420), the steering control device 10 may terminate the calculation of the rack position offset.

If it is determined that the host vehicle is driving in a straight line (Yes in S420), the steering control device 10 may determine whether the straight travel time of the host vehicle is equal to or longer than the storage reference time (S430). Here, the storage reference time may include a predetermined period in order to secure for receiving the minimum rack position information whenever the rack position is received at predetermined period. That is, the storage reference time may be longer than a predetermined period.

If the straight travel time of the host vehicle is equal to or longer than the storage reference time (Yes in S430), the steering control device 10 may receive the rack position to store the first summation value in the short-team storage 130 (S440).

If the straight travel time of the host vehicle is less than the storage reference time (No in S430), the steering control device 10 may determine that there is no time to receive the rack position and terminate the calculation of the rack position offset.

Figure 5:
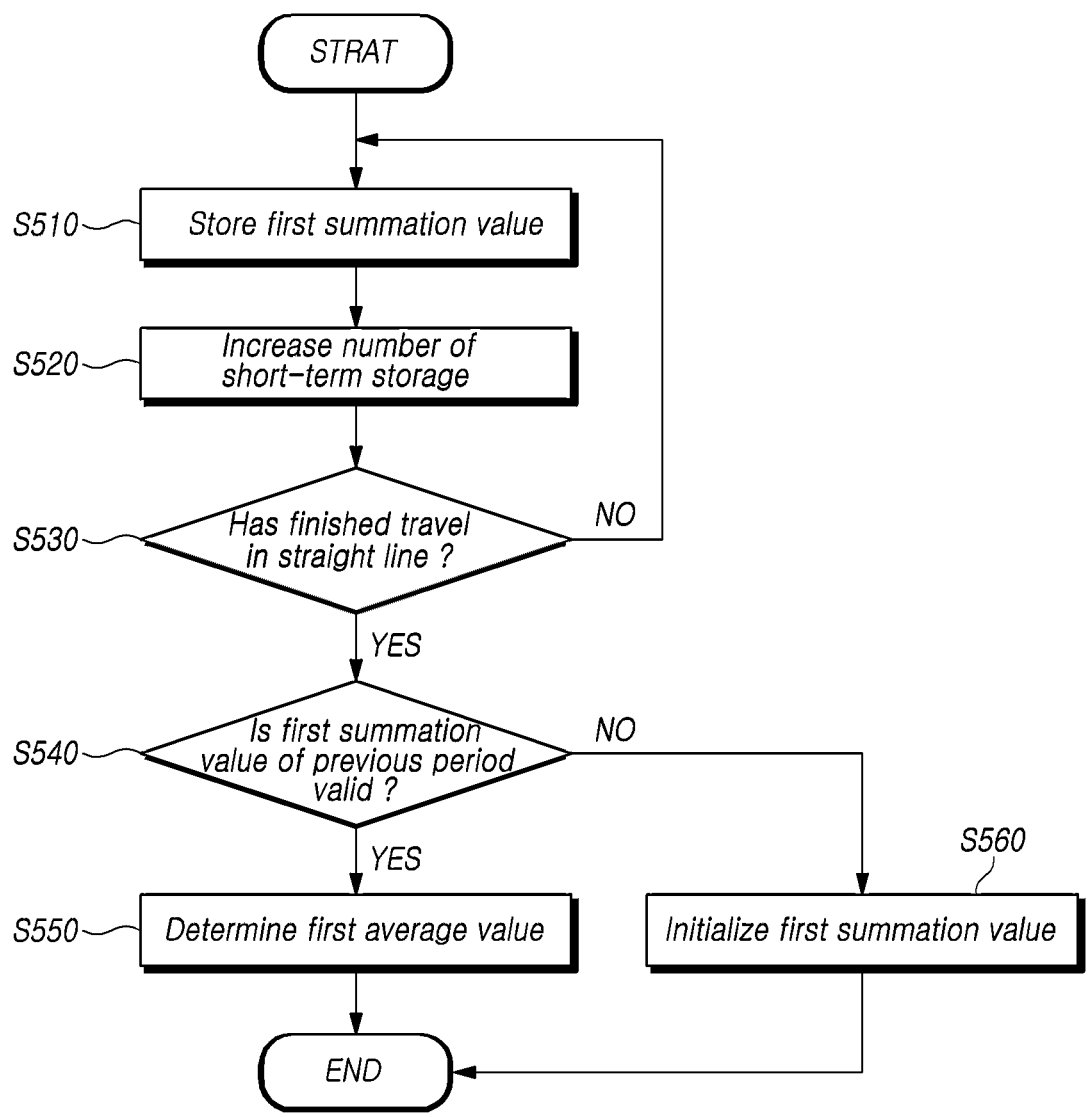
FIG. 5 is a diagram for describing step S330 in more detail according to an embodiment.

FIG. 5 is a diagram for describing step S330 in more detail according to an embodiment.

Referring to FIG. 5, the steering control device 10 may store the first summation value (S510). Here, the summation value may be calculated by summing the received rack positions. Accordingly, if the host vehicle is driving in a straight line and the straight travel time is determined to be greater than or equal to a predetermined period, the first summation value may be calculated. Accordingly, if the host vehicle continues to travel in a straight line, the first summation value may be increased by adding the continuously received rack position to the first summation value of the previous period.

If the first summation value is stored, the steering control device 10 may add or increase the number of short-term storage (S520). In other words, adding or increasing of the number of short-term storage may be referred to as counting the first summation value.

The steering control device 10 may determine whether the straight-line driving situation of the host vehicle has finished (S530). In more detail, the steering control device 10 may determine, based on the received vehicle driving information, whether the host vehicle has finished the straight-line travel or whether the straight-line travel has been finished within a straight-driving determination time.

If the straight-line driving situation of the host vehicle does not end (No in S530), the steering control device 10 may receive the rack position at predetermined period to calculate a first summation value, and add or increase the number of short-term storage.

If the straight-line driving situation of the host vehicle ends (Yes in S530), the steering control device 10 may determine whether the first summation of the previous period is valid (S540). The steering control device 10 may determine whether the first summation value is abnormally stored or not stored.

If the first summation value of the previous period is valid (Yes in S540), the steering control device 10 may determine a first average value (S550). Here, the first average value may be determined by dividing the continuously summed first summation value by the added number of short-term storage.

If the first summation value of the previous period is not valid (No in S540), the steering control device 10 may initialize the first summation value (S560).

FIG. 6 is a diagram for describing step S340 in more detail according to an embodiment.

Referring to FIG. 6, the steering control device 10 may store a first average value (S610).

If the first average value is stored, the steering control device 10 may add or increase the number of long-term storage (S620). Accordingly, the steering control device 10 may determine the rack position offset value by dividing the second summation value of the first average values by the number of long-term storage.

The steering control device 10 may determine whether the number of long-term storage is less than the minimum storage number (S630).

If the number of long-term storage is equal to or greater than the minimum storage number (No in S630), the steering control device 10 may end data storage and calculate a standard error of the rack position for determining the rack position offset.

If the number of long-term storage is less than the minimum storage number (Yes in S630), the steering control device 10 may store the second summation value (S640)

In an embodiment, when storing the first summation value and the number of short-term storage, the steering control device 10 may add or increase the number of long-term storage. In addition, if the number of long-term storage is less than the minimum storage number, the steering control device 10 may determine a first average value, determine a second summation value by the calculated first average value, and store the second summation value.

FIG. 7 is a diagram for describing in detail step S350 according to an embodiment.

Referring to FIG. 7, the steering control device 10 may determine whether the number of long-term storage is less than the maximum storage number (S710). The steering control device 10 may set an upper limit for calculating the rack position offset according to a preset number of long-term storage.

If the number of long-term storage is less than the maximum storage number (Yes in S710), the steering control device 10 may determine whether the number of long-term storage is equal to or greater than the minimum storage number (S720). The steering control device 10 may set a lower limit to increase the reliability of the rack position offset so that the rack position offset can be calculated from a lot of samples.

If the number of long-term storage is less than the minimum storage number (No in S720), the steering control device 10 may end the calculation of the rack position offset and store the second summation in order to store a large number of samples.

If the number of long-term storage is equal to or greater than the minimum storage number (Yes in S720), the steering control device 10 may determine a standard error and determine whether the determined standard error is less than a reference value (S730). The steering control device 10 may determine a standard error and compare it with a reference value in order to improve the reliability of the rack position offset.

If the standard error is equal to or greater than the reference value (No in S730), the steering control device 10 may end the calculation of the rack position offset. In an embodiment, the steering control device 10 may store the second summation value, recalculate the standard error when the next long-term storage number is added, and determine whether the standard error is less than the reference value.

If the standard error is less than the reference value (Yes in S730), the steering control device 10 may determine the rack position offset (S740). The rack position offset may be determined by dividing the second summation by the number of long-term storage.

If the number of long-term storage is greater than or equal to the maximum storage number (No in S710), the steering control device 10 may determine the rack position offset (S740)

As described above, in the embodiments of the steering control device and method according to the present disclosure, since a standard deviation is calculated instead of the simple mean and the standard error is calculated based on this, it is possible to conservatively deal with erroneously calculated or biased data.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device comprising:
   a receiver configured to receive vehicle driving information of a host vehicle from a plurality of sensors;
   a straight-driving determiner configured to determine whether the host vehicle travels in a straight line based on the vehicle driving information, and determine a straight travel time when determined that the host vehicle travels in the straight line;
   a short-term storage configured to store a first summation value obtained by summing rack positions received every predetermined period;
   a long-term storage configured to store a first average value of the first summation values stored in the short-term storage; and
   a determiner configured to determine a standard error of a rack position based on the first average value, and determine a rack position offset of the host vehicle if the standard error is less than a reference value.

2. The steering control device of claim 1, wherein the long-term storage increases a long-term storing number if the first average value is stored, and the determiner determines the rack position offset if the long-term storing number is greater than or equal to a maximum storing number.

3. The steering control device of claim 2, wherein the long-term storage sums the first average value and stores a second summation value if the long-term storing number is less than or equal to a minimum storing number.

4. The steering control device of claim 3, wherein the determiner determines a second average value by dividing the second summation value by the long-term storing number, and determines the second average value as the rack position offset.

5. The steering control device of claim 1, wherein the short-term storage increases a short-term storing number when storing the first summation value, and the first average value is determined by dividing the first summation value by the short-term storing number.

6. The steering control device of claim 1, wherein the short-term storage stores the first summation value if determined that the host vehicle travels in the straight line and the straight travel time is greater than a storage reference time.

7. The steering control device of claim 6, wherein the storage reference time is set including a specific period.

8. The steering control device of claim 1, wherein the long-term storage stores the first average value if determined that the host vehicle has finished the travel in the straight line.

9. A steering control method comprising:
   receiving vehicle driving information of a host vehicle from a plurality of sensors;
   determining whether the host vehicle travels in a straight line based on the vehicle driving information, and determining a straight travel time when determined that the host vehicle travels in the straight line;
   storing a first summation value obtained by summing rack positions received every predetermined period;
   storing a first average value of the first summation values stored; and
   determining a standard error of a rack position based on the first average value, and determining a rack position offset of the host vehicle if the standard error is less than a reference value.

10. The steering control method of claim 9, wherein the storing a first average value comprises increasing a long-term storing number if the first average value is stored, and the determining a rack position comprises determining the rack position offset if the long-term storing number is greater than or equal to a maximum storing number.

11. The steering control method of claim 10, wherein the storing a first average value comprises summing the first average value and storing a second summation value if the long-term storing number is less than or equal to a minimum storing number.

12. The steering control method of claim 11, wherein the determining a rack position comprises determining a second average value by dividing the second summation value by the long-term storing number, and determining the second average value as the rack position offset.

13. The steering control method of claim 9, wherein the storing a first summation value comprises increasing a short-term storing number when storing the first summation value, and the first average value is determined by dividing the first summation value by the short-term storing number.

14. The steering control method of claim 9, wherein the storing a first summation value comprises storing the first summation value if determined that the host vehicle travels in the straight line and the straight travel time is greater than a storage reference time.

15. The steering control method of claim 14, wherein the storage reference time is set including a specific period.

16. The steering control method of claim 9, wherein the storing a first average value comprises storing the first average value if determined that the host vehicle has finished the travel in the straight line.

* * * * *